(12) United States Patent
Lescanec et al.

(10) Patent No.: US 8,596,863 B2
(45) Date of Patent: Dec. 3, 2013

(54) TEMPERATURE INDICATING INSULATING SLEEVE FOR A COOKING VESSEL

(75) Inventors: Robert L. Lescanec, Norwood, MA (US); W. Perry Dowst, Weare, NH (US)

(73) Assignee: Johnson Outdoors Inc., Racine, WI (US)

( * ) Notice: Subject to any disclaimer, the term of this patent is extended or adjusted under 35 U.S.C. 154(b) by 0 days.

(21) Appl. No.: 12/867,164

(22) PCT Filed: Jan. 7, 2010

(86) PCT No.: PCT/US2010/020339
§ 371 (c)(1),
(2), (4) Date: Aug. 11, 2010

(87) PCT Pub. No.: WO2010/080888
PCT Pub. Date: Jul. 15, 2010

(65) Prior Publication Data
US 2011/0253030 A1  Oct. 20, 2011

Related U.S. Application Data

(60) Provisional application No. 61/143,226, filed on Jan. 8, 2009.

(51) Int. Cl.
*G01K 11/02* (2006.01)
*G01K 1/02* (2006.01)
*A47J 36/00* (2006.01)

(52) U.S. Cl.
USPC .......................................... 374/162; 116/216

(58) Field of Classification Search
USPC ................. 374/149, 150, 157, 161, 162, 148;
99/342, 343, 344; 116/216
See application file for complete search history.

(56) References Cited

U.S. PATENT DOCUMENTS

| 3,782,195 | A | * | 1/1974 | Meek et al. | 374/161 |
| 4,805,188 | A | * | 2/1989 | Parker | 374/141 |
| 4,878,588 | A | * | 11/1989 | Ephraim | 215/11.2 |
| 4,933,525 | A | * | 6/1990 | St. Phillips | 219/725 |
| 5,385,044 | A | * | 1/1995 | Thomas et al. | 73/295 |

(Continued)

FOREIGN PATENT DOCUMENTS

| JP | 60182920 | A | * | 9/1985 |
| JP | 62-76888 | | | 5/1987 |

(Continued)

OTHER PUBLICATIONS

ISA/US, International Search Report, dated Mar. 15, 2010 (2 pgs).

*Primary Examiner* — R. A. Smith
(74) *Attorney, Agent, or Firm* — Reinhart Boerner Van Deuren P.C.

(57) ABSTRACT

A cooking vessel sidewall cover is provided with an opening therein and a screen is placed over the opening, with the screen including a layered structured between the cover opening and the vessel to include a non-opaque substrate, a layer of thermochromic colorant that changes from a opaque color to a non-opaque color when exposed to a predetermined temperature, and a layer of indicia material which is visible from an outer side of the substrate opening when the thermochromic ink changes to a non-opaque color. The cover may also include protective transparent or translucent window members on either side of the opening, and the substrate may be attached by way of an adhesive.

21 Claims, 3 Drawing Sheets

(56) References Cited

U.S. PATENT DOCUMENTS

| | | | | |
|---|---|---|---|---|
| 5,408,987 A | * | 4/1995 | Mifune et al. | 126/262 |
| 5,482,373 A | * | 1/1996 | Hutchinson | 374/141 |
| 5,513,623 A | * | 5/1996 | Hong | 126/38 |
| 5,562,154 A | * | 10/1996 | Benson et al. | 165/96 |
| 5,568,805 A | * | 10/1996 | Nitta et al. | 126/262 |
| 5,588,747 A | * | 12/1996 | Blevins | 374/157 |
| 5,720,555 A | * | 2/1998 | Elele | 374/150 |
| 5,761,987 A | * | 6/1998 | Leon et al. | 99/297 |
| 5,773,795 A | * | 6/1998 | Messmer | 219/441 |
| 5,997,964 A | * | 12/1999 | Klima, Jr. | 428/1.54 |
| 6,264,049 B1 | * | 7/2001 | Shteynberg | 215/11.2 |
| 6,324,963 B1 | * | 12/2001 | Cirasole | 99/285 |
| 6,386,756 B1 | * | 5/2002 | Rice | 374/157 |
| 6,848,355 B2 | * | 2/2005 | Cesare | 99/342 |
| 6,962,106 B2 | * | 11/2005 | Viraldo | 99/339 |
| RE39,044 E | | 3/2006 | Ross | |
| 7,028,634 B1 | * | 4/2006 | Lee | 116/207 |
| 7,798,706 B2 | * | 9/2010 | LaGuardia et al. | 374/157 |
| 7,849,786 B2 | * | 12/2010 | Ferron | 99/342 |
| 2004/0149720 A1 | | 8/2004 | Lerner | |
| 2006/0081639 A1 | | 4/2006 | Lazaroff et al. | |
| 2007/0068936 A1 | | 3/2007 | Wu | |
| 2008/0285621 A1 | * | 11/2008 | Rowen | 374/150 |

FOREIGN PATENT DOCUMENTS

| | | | | |
|---|---|---|---|---|
| JP | 06-043042 | | 2/1994 | |
| JP | 06343566 A | * | 12/1994 | A47K 3/02 |
| JP | 2002-014556 | | 1/2002 | |
| JP | 2005177438 A | * | 7/2005 | A47J 45/07 |
| WO | WO 9627318 A1 | * | 9/1996 | A47J 31/44 |
| WO | WO 2007125552 A1 | * | 11/2007 | A47J 31/30 |

* cited by examiner

TEMPERATURE INDICATING INSULATING SLEEVE FOR A COOKING VESSEL

CROSS REFERENCE TO RELATED APPLICATION

This application claims priority to U.S. Provisional Patent Application Ser. No. 61/143,226 entitled "Temperature Indicating Insulating Sleeve For A Cooking Vessel" filed on Jan. 8, 2009. The content of this application is incorporated herein by reference in its entirety.

TECHNICAL FIELD

This invention relates generally to cooking vessels and, more particularly, to a insulative sleeve that includes an indicator of the temperature of a liquid within the vessel.

BACKGROUND OF THE INVENTION

A product that has recently gained popularity with campers, hikers and people involved in other outdoor activities is a portable stove that can be used to quickly and efficiently heat a liquid/food item in a containing vessel. One such stove and vessel is described in co-pending U.S. patent application Ser. No. 10/603,947, assigned to the assignee of the present invention.

As described in that patent application, in order to insulate the vessel from the loss of heat to the atmosphere, and in order to allow the user to freely handle the vessel without touching a hot surface, an insulative cover is provided around the outer side of the vessel. However, either with or without the insulative cover, it is generally been necessary for the user to look inside of the vessel in order to determine whether the contained material has reached the desired temperature. That is, for coffee, for example, it is desired that the temperature of the water within the vessel reaches the boiling point of 100° centigrade. If the user needs to open the lid to view the liquid to determine its temperature, heat will be lost to the atmosphere, each time that this occurs. Further, for desired temperatures below the boiling level, it is difficult to determine by this method, the temperature of the liquid inside the vessel.

What is needed is a method/apparatus for indicating to the user, in a simple and effective manner, when the temperature of the material inside the vessel has reached a predetermined temperature level.

DISCLOSURE OF THE INVENTION

Briefly, in accordance with one aspect of the invention, a temperature sensor screen is placed near an outer surface of the cooking vessel such that, as the walls of the vessel are heated by the temperature of the material inside, the screen responsively changes color so as to provide an indication to the user when the temperature of the material inside reaches a predetermined temperature.

In accordance with another aspect of the invention, an opening is provided in an insulative cover, and the temperature sensitive screen is installed over the opening so as to be visible to the user on the its outer side.

By yet another aspect of the invention, the temperature sensitive screen includes a thermochromic ink which is opaque in appearance when in the unheated condition but which changes to a clear color as it reaches a predetermined temperature.

DETAILED DESCRIPTION OF THE INVENTION

Figure 1:
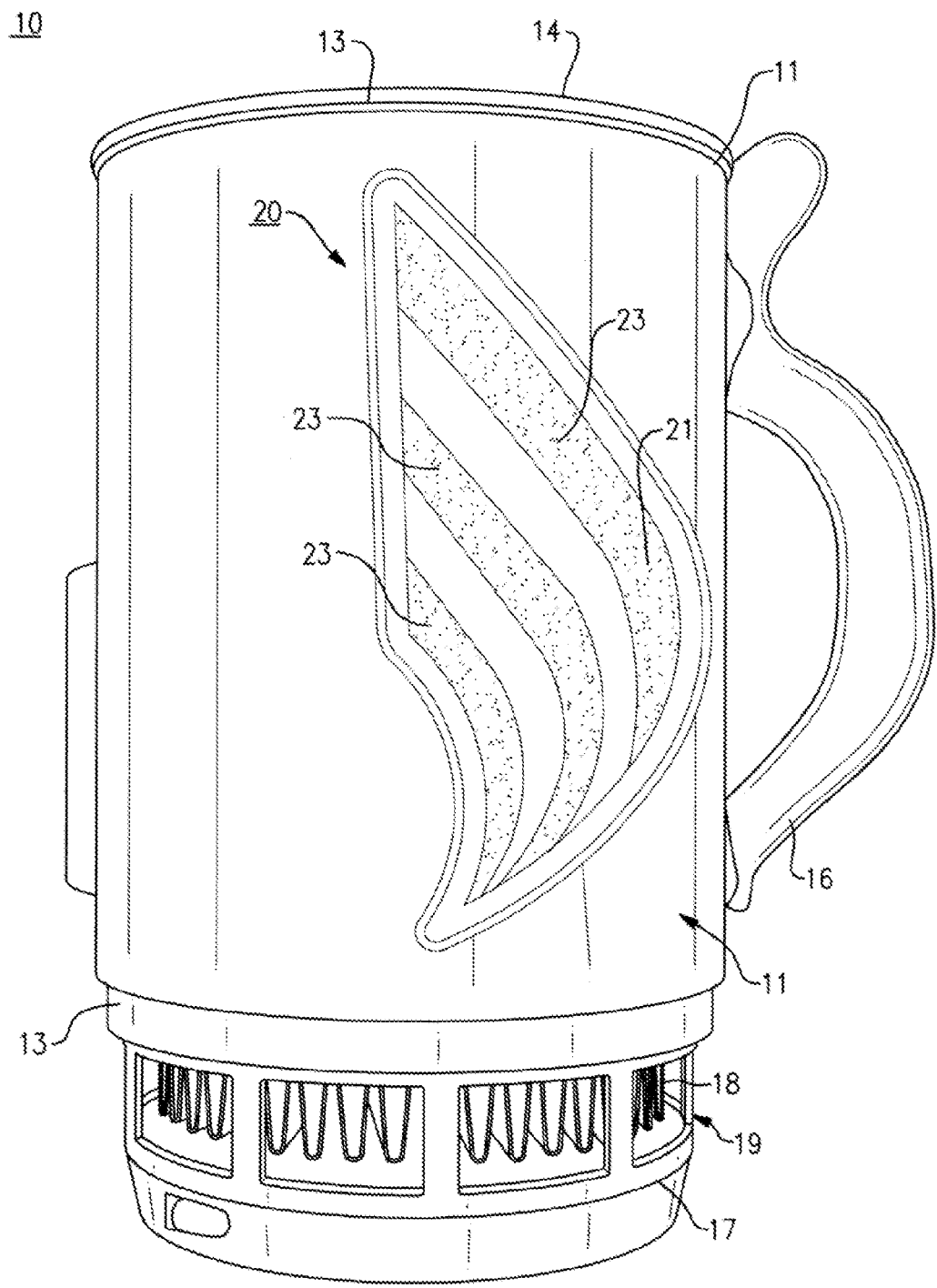
FIG. 1 is a perspective view of a cooking vessel and its insulative cover with the present invention incorporated therein.

Referring now to FIG. 1, the invention is shown generally at 10 as applied to an insulative cover 11 around the outer side surface 12 of a cooking vessel 13.

The cooking vessel 13 has an open top end 14 for receiving a liquid beverage or food item to be heated or cooked. A handle 16 is provided on its one side for purposes of handling the cooking utensil 13 during the heating/cooking process and for drinking/eating from the opened top end 14 after the preparation of the beverage/food. At the lower end of the cooking vessel 13, there is provided a transition member 17 which is adapted to interface with a burner as shown in U.S. patent application Ser. No. 10/603,947, incorporated herein by reference. Briefly, the burner is disposed below the transition member 17, and the heat rises up through the transition member 17 so as to transfer heat to a heat transfer member 18 secured to the lower side of the cooking vessel 13, with the exhaust then passing radially outwardly through the openings 19. The burner head is an open-flame type which heats the contents of the cooking vessel by open-flame heating.

In accordance with the present invention, a temperature indicating window 20 is provided in the insulated cover 11 as shown. The particular embodiment shown comprises an outer plastic window 21, which provides a waterproof protective shield, and a temperature indicating material 23 which is sensitive to the temperature of the outer surface of the vessel so as to change from an opaque color as shown to a clear color to expose an image or indicia underneath, as will be described more fully hereinafter. Briefly, as the substance in the cooking vessel 13 is heated to a predetermined level, the heat is transferred to the heating vessel outer side surface 12 (FIG. 2) and hence to the temperature sensitive material 23. When that temperature reaches a predetermined level, it changes from a dark color as shown to a clear color to thereby expose the image/indicia, underneath to thereby indicate to the observer that the liquid has been brought to a desired temperature.

The temperature that is predetermined by the formulation of the temperature sensitive material 23 will depend on various factors. For example, the user may be interested in being informed when the temperature of the liquid/food in the vessel reaches a temperature that is anywhere in the range between lukewarm and boiling. Further, it is necessary to consider that, as the contents of the cooking vessel 13 are heated, there will a lag in the temperature rise at the vessel outer side surface 12. As an example, the applicants have found that a typical predetermined temperature for the temperature sensitive material 23 to change from dark to transparent is 60° C. when the temperature of water within the cooking vessel 13 reaches the boiling point of 100° C.

Other factors which contribute to determining the predetermined temperature at which the temperature sensitive material will change include the vessel design, the burner output, the volume of liquid/food in the vessel, the type of material in the vessel, etc. Thus, the predetermined temperature may be anywhere in the range of 40° C. to 100° C.

Figure 2:
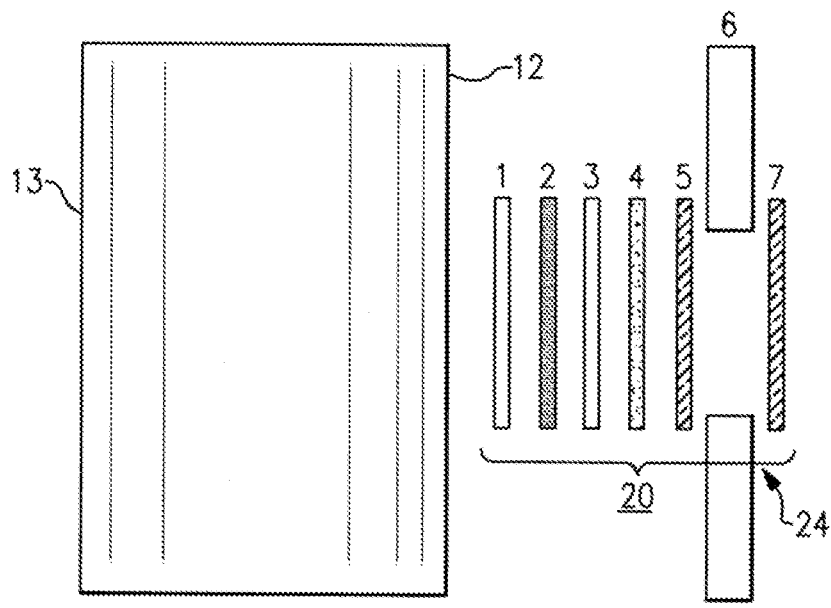
FIG. 2 is an exploded schematic view thereof.

Considering now in greater detail the particular features of the temperature indicating window 20, reference is made to FIG. 2 wherein the various layers are shown in accordance with one particular embodiment. The thermal insulator 6, which is equivalent to the insulated cover 11 described hereinabove, is shown as applied to the cooking vessel 13. Formed in the thermal insulator 6 is an opening 24 over which the temperature indicating window 20 is installed. In order to protect the inner portions of the temperature indicating window, an inner window 5 and/or outer window 7 is provided to seal the area from the entry of outside moisture, dirt, and the like. The windows can be comprised of any suitable material such as plastic, glass or the like. For example, polyurethane, polycarbonate, polyester, or other thermal plastic material may be used, with its edges being secured to the surrounding portions of the thermal insulator 6 by the process of ultrasonic welding or the like.

Located inside the inner window 5 is a substrate 3 which, again, is a transparent or translucent material such a polyurethane, polycarbronate, polyester, or the like. In order to facilitate the assembly process, an adhesive layer 4 may be placed between the inner window 5 and the substrate 3. That is, in the assembly process it may be pre-applied to either the inner side of the inner window 5 or the outer side of the substrate 3.

Applied to the inner surface of the substrate 3 is first a thermochromic colorant that changes from opaque to transparent upon reaching a predetermined temperature, and secondly, an image or indicia 1 which will be observable by the user, from his view through outer window 7, when the thermochromic colorant 2 changes from opaque to transparent.

In the embodiment as shown, the thermal insulator is first produced with the opening 24 and with an inner window 5 and/or outer window 7. The other layers are then applied to the inner surface of the inner window 5 in a manner to be described hereinafter.

The present invention may also be accomplished in various other embodiments as indicated in the lower portion of FIG. 2. For example, as a second embodiment, the outer window may be eliminated. As a third embodiment, the substrate 3 and the adhesive may be eliminated, with the layers 1 and 2 being applied directly to the inner side of the inner window 5. In the fourth embodiment, the outer window 7 may be eliminated. In the fifth embodiment, the inner window 5 may be eliminated with the substrate 3 being adhesively adhered to the inner side of the outer window 7. In the sixth embodiment, both the inside window 5 and the outside window 7 may be eliminated with the substrate 3 being adhesively adhered to the inner edges of the thermal insulator 6.

Figure 3:
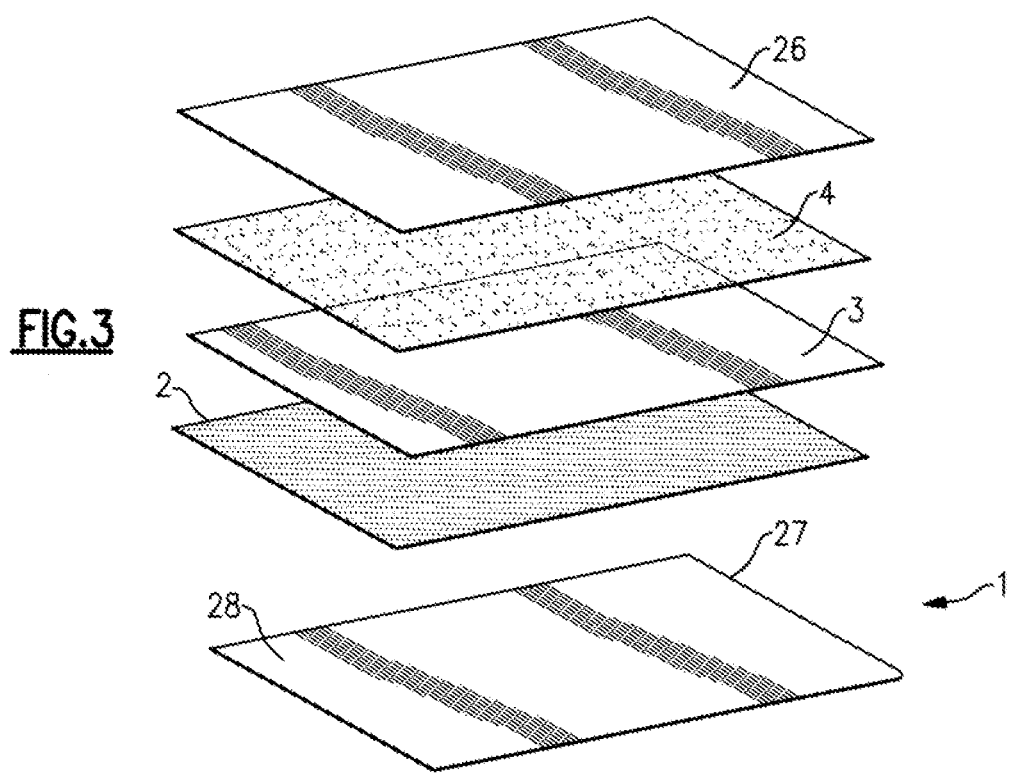
FIG. 3 is an exploded perspective view of the screen portion of the invention.

Considering now the construction of the temperature indicating window 20, the various layers of materials that constitute the sticker that is applied to the thermal insulator 6 or to one of its windows 5 or 7 is shown in FIG. 3. The outer side of the sticker i.e. the top three layers, is a composite item that is commercially available as Mylar and includes a removable sticker backing 26, a sticker adhesive 4 and a transparent sticker substrate 3.

Affixed to the inner side (or the under side as shown in FIG. 3) of the substrate 3 is the layer of thermochromic ink 2. Applied over the coat of thermochromic ink is the image or indicia 1 which comprises a layer of PMS 810C ink 27 and a layer of white ink 28 as shown.

Figure 4A:
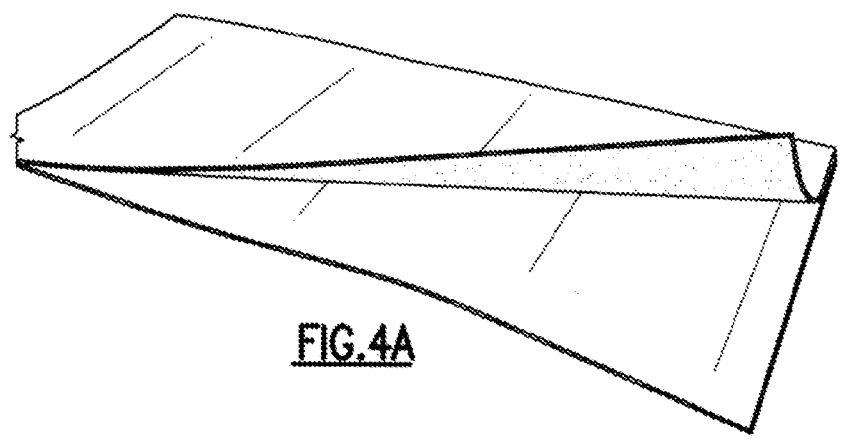
FIGS. 4A and 4B are perspective views of the screen portion of the invention prior to application to the utensil.
Figure 4B:
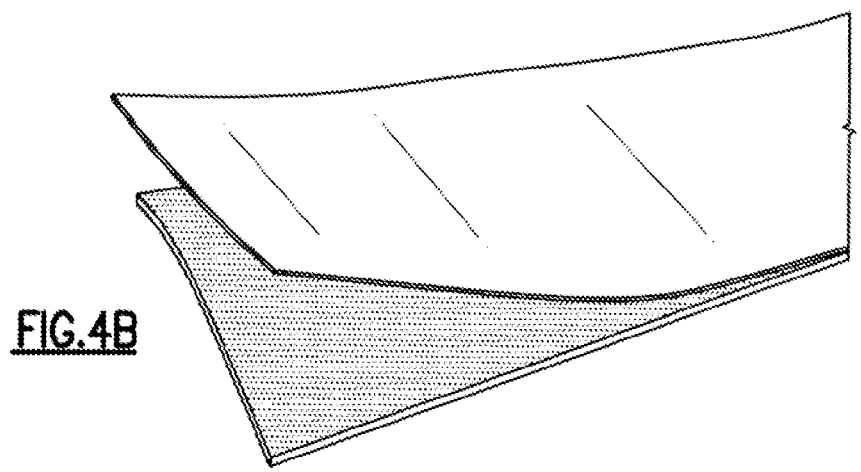

To apply the sticker to the thermal insulator 6, or preferably to one of its windows 5 or 7, the sticker backing 26 is simply removed and the remaining layers are adhesively attached to an inner side of the thermal insulator or to that of the window 5 or 7. The one layer removal process is shown in more detail in FIGS. 4A and 4B.

Figure 4C:
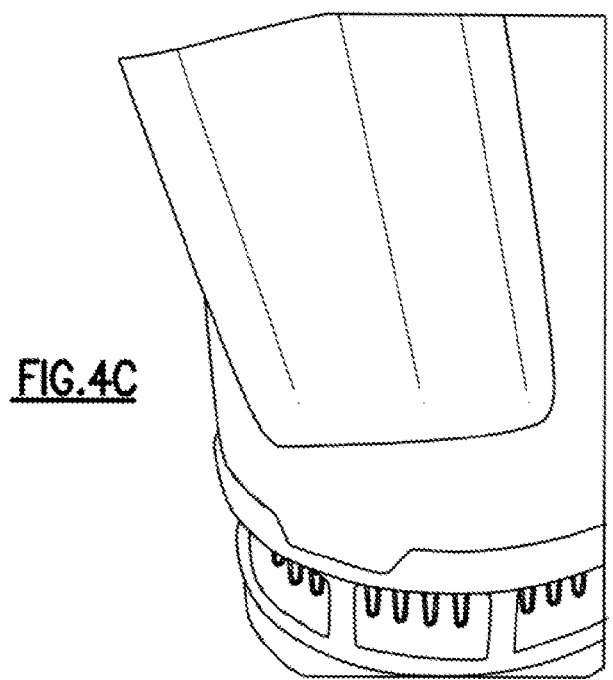
FIG. 4C is a perspective view of the applied screen at a time of changing colors.

In FIG. 4C there is shown a demonstration of what occurs when the temperature sensitive material 23 reaches a predetermined temperature. As will be seen, for a predetermined temperature of 60° centigrade, at temperatures below that level, the temperature sensitive material will remain dark or opaque, whereas at temperatures greater than 60° centigrade, it will turn to a transparent color to thereby reveal a colored layer thereunder.

While the present invention has been particularly shown and described with reference to the preferred mode as illustrated in the drawings, it will be understood by one skilled in the art that various changes in detail may be effected therein without departing from the spirit and scope of the invention as defined by the claims.

We claim:

1. A temperature indicator for a cooking vessel having an internal cavity for receiving a material to be open-flame heated and an outer side surface, comprising:
   a thermal insulator having a cylindrical sidewall extending between an open top and an open bottom and including a temperature indicating window to be disposed in close proximity to the vessel outer side surface, the open bottom of the thermal insulator adapted to expose a closed bottom of the cooking vessel such that the closed bottom extends axially beyond a lower-most edge of the sidewall of the thermal insulator, and comprising:
   a non-opaque substrate;
   a layer of thermochromic ink disposed on an inner side of said substrate and adapted to change from a dark color to a clear color when exposed to a predetermined temperature as caused from the transfer of heat from the vessel outer side surface; and
   a layer of material disposed on the inner side of said thermochromic ink layer and including indicia that is visible from an outer side of said substrate when said layer of thermochromic ink changes to a transparent color.

2. A temperature indicator as set forth in claim 1 wherein said temperature indicating window is disposed over an inner side of an opening formed in a thermal insulator, said thermal insulator covering a majority of said cooking vessel outer side surface.

3. A temperature indicator as set forth in claim 2 and including an adhesive disposed between an outer surface of said substrate and said thermal insulator.

4. A temperature indicator as set forth in claim 2 and including an inner window disposed between said substrate and said thermal insulator opening.

5. A temperature indicator as set forth in claim 4 and including an adhesive material disposed between said substrate and said inner window.

6. A temperature indicator as set forth in claim 2 and including an outer window disposed on an outer side of said thermal insulator opening.

7. A temperature indicator as set forth in claim 2 and including both an inner transparent window and an outer window disposed on respective inner and outer sides of said thermal insulator opening.

8. A temperature indicator as set forth in claim 2 wherein said substrate comprises an inner window secured to said thermal insulator at a position inside of said opening.

9. A temperature indicator as set forth in claim 2 wherein said substrate comprises an outer window secured to said thermal insulator at a position outside of said opening.

10. A temperature indicator as set forth in claim 2 wherein said substrate is secured to an inner side of said thermal insulator.

11. A method of constructing a temperature indicator for a cooking vessel having an internal cavity for receiving a material to be open-flame heated and an outer side surface, comprising the steps of:
   providing a thermal insulator having a cylindrical sidewall extending between an open top and an open bottom, the thermal insulator to be placed over the sides of said vessel, said thermal insulator having an opening therein to expose an area of said vessel side surface, and wherein the open bottom of the thermal insulator exposes a closed bottom of the cooking vessel such that the closed bottom extends axially be beyond a lower-most edge of the sidewall of the thermal insulator;
   providing a non-opaque substrate;
   providing a layer of thermochromic ink on an inner side of said substrate said ink being adapted to change from a dark color to a clear color when exposed to a predetermined temperature;
   providing a layer of indicia material on the inner side of said thermochromic ink layer, said layer of indicia material including indicia that is visible from an outer side of said substrate when said layer of thermochromic ink changes to a non-opaque color; and
   locating the combination of said substrate, said layer of thermochromic ink, and said layer of indicia material on an inner side of said thermal insulator opening.

12. A method as set forth in claim 11 and including the step of providing an adhesive layer between an outer surface of said substrate and said thermal insulator.

13. A method as set forth in claim 11 and including the step of providing an inner window between said substrate and said thermal insulator opening.

14. A method as set forth in claim 13 and including the step of providing an adhesive material between said substrate and said inner window.

15. A method as set forth in claim 11 and including an outer transparent window disposed on the outer side of said thermal insulator window opening.

16. A method as set forth in claim 11 and including the steps of providing both an inner window and an outer window on the respective and inner and outer sides of said thermal insulator opening.

17. A method as set forth in claim 11 wherein said substrate comprises an inner window secured to said thermal insulator at a position inside of said opening.

18. A method as set forth in claim 11 wherein said substrate comprises a window secured to said thermal insulator at a position outside of said opening.

19. A method as set forth in claim 11 wherein said substrate is attached to an inner side of said thermal insulator.

20. A temperature indicator for a cooking vessel having an internal cavity for receiving a material to be open-flame heated and an outer side surface, comprising:
   a thermal insulator having a cylindrical sidewall extending between an open top and an open bottom covering a majority of a side surface of said cooking vessel, said thermal insulator having an opening to said side surface of said cooking vessel, and wherein the open bottom exposes a closed bottom of the cooking vessel such that the closed bottom extends axially beyond a lower most edge of the sidewall of the thermal insulator;
   a temperature indicating window to be disposed in close proximity to said side surface of said cooking vessel, said temperature indicating window disposed over an inner side of said opening formed in said thermal insulator; said temperature indicating window comprising:
   a layer of thermochromic ink disposed on an inner side of a substrate and adapted to change from a dark color to a clear color when exposed to a predetermined temperature as caused from the transfer of heat from the vessel outer side surface; and
   a layer of material disposed on the inner side of said thermochromic ink layer and including indicia that is visible from an outer side of said substrate when said layer of thermochromic ink changes to a transparent color.

21. A cooking assembly for cooking a material using an open flame heat source, the assembly comprising:
   a cooking vessel having a generally cylindrical sidewall extending between an open top and a closed bottom to define an internal cavity for receiving the material, the generally cylindrical sidewall having an outer side surface;
   a thermal insulator having a cylindrical sidewall extending between an open top and an open bottom and including a temperature indicating window to be disposed in close proximity to the vessel outer side surface and comprising:
      a non-opaque substrate;
      a layer of thermochromic ink disposed on an inner side of said substrate and adapted to change from a dark color to a clear color when exposed to a predetermined temperature as caused from the transfer of heat from the vessel outer side surface;
      a layer of material disposed on the inner side of said thermochromic ink layer and including indicia that is visible from an outer side of said substrate when said layer of thermochromic ink changes to a transparent color;
   wherein the closed bottom of the cooking vessel is exposed through the open bottom of the thermal insulator such that the closed bottom extends axially beyond a lower-most edge of the sidewall of the thermal insulator.

* * * * *

UNITED STATES PATENT AND TRADEMARK OFFICE
CERTIFICATE OF CORRECTION

| | | |
|---|---|---|
| PATENT NO. | : 8,596,863 B2 | Page 1 of 1 |
| APPLICATION NO. | : 12/867164 | |
| DATED | : December 3, 2013 | |
| INVENTOR(S) | : Robert L. Lescanec et al. | |

It is certified that error appears in the above-identified patent and that said Letters Patent is hereby corrected as shown below:

In the Claims

In column 5, line 15, the word "be" should be deleted.

Signed and Sealed this
Twenty-fifth Day of February, 2014

Michelle K. Lee
*Deputy Director of the United States Patent and Trademark Office*